United States Patent Office 3,830,824
Patented Aug. 20, 1974

3,830,824
PHYSIOLOGICAL ORGANIC ACID SILVER
ALLANTOINATES
Harry W. Margraf, Clayton, Mo., assignor of a fractional part interest to Allen P. Klippel, St. Louis, Mo.
No Drawing. Filed July 23, 1971, Ser. No. 165,737
Int. Cl. C07d 49/32
U.S. Cl. 260—299                    3 Claims

ABSTRACT OF THE DISCLOSURE

The application discloses the preparation and uses of physiological organic acid silver salts of allantoin, specifically silver citro allantoinate and silver lacto allantoinate. These are stable, and are suitable for application to open wounds and burns without toxicity or irritation.

CROSS REFERENCE TO RELATED APPLICATION

Incorporated by reference herein is the disclosure of the patent application filed simultaneously, entitled "Anti-Microbial Composition Utilizing Allantoin Carrier," Ser. No. 165,753 filed July 23, 1971.

BACKGROUND OF THE INVENTION

Silver has long been known for its disinfectant properties. The inorganic silver salts are efficient germicides, but their practical value is restricted by irritant, astringent, and caustic effects. Silver nitrate is the most soluble and most extensively used silver salt, particularly for the treatment of severely burned patients in the form of a 0.5% solution. It has serious disadvantages, including its caustic and irritant properties, the toxicity of the nitrate ion, and its loss of efficiency due to reaction of silver ions with and absorption into body tissues, body fluids and dressings. Silver nitrate also tends to stain bandages, bed clothes, and skin.

Other silver salts also are effective germicides, particularly silver citrate. However, each has its characteristic disadvantages; for example silver citrate is very slightly soluble in water; yet it tends to decompose upon exposure to light or air.

Silver allantoinate is known, for example from patent No. 2,336,131 to Schaeffer, which discloses that it avoids the irritating and erosive effects of silver nitrate and offers the healing qualities of allantoin. It has not come into use, partly because of the reluctance of the medical profession, familiar with the potential dangers of silver compounds, to subject body tissues and fluids to them except under carefully controlled circumstances. One advantage of silver allantoinate, which does not appear to be known, is that ionic silver is made available by a slow, progressive release process. During this process some silver ions combine with proteins available at the aqueous surfaces of wounds to form silver proteinate, which in turn liberates additional silver ions.

SUMMARY OF THE INVENTION

A principal object of the present invention is to provide silver in a readily usable form to be liberated slowly as needed. Another object is to provide allantoin compounds of silver in a form most physiologically acceptable. An additional object is to incorporate a normally unstable silver salt of a physiological organic acid in a stable composition which does not decompose or blacken when exposed to sunlight, or air. Still another object is to provide a method of preparing a composition which serves the foregoing objects.

The invention comprises compounds formed by the reaction of silver, a physiological organic acid, and allantoin, which are stable and release silver ions as needed. The term "physiologic organic acid" is here used to mean those acids occurring or taking part in normal metabolic processes. The compounds so formed are physiologically compatible with the human body; they are safely administered to open wounds and severe burns. Their presence and their substitution for other ingredients avoids chemical reactions which might be harmful or irritating. The physiological organic acids which form silver-organic acid-allantoin complexes include: acetic, lactic, pyruvic, citric, stearic and palmitic acid, and the amino acids.

The invention further comprises a method of preparing a stable compound of a silver salt of allantoin and a physiological organic acid, including the steps of reacting silver ions, physiological organic acid ions, and allantoin.

DETAILED DESCRIPTION

Silver lacto allantoinate and silver citro allantoinate are preferred examples of the present invention. From the following examples of their preparation, it will be apparent to persons skilled in the art how allantoinates of the other physiological organic acids may be prepared.

EXAMPLE NO. 1

Silver Lacto Allantoinate

Method of preparation

Dissolve 25 gm. of allantoin in 1 liter of hot water (75° C.). Add 400 ml. of silver lactate (6% filtered solution) which equals 12 gm. Ag$^+$.

The reaction mixture is completely cooled at room temperature and then transferred to a refrigerator (4° C.) for 1 hour.

A white, crystalline, heavy precipitate results, which is filtered off, washed with cold (4° C.) distilled water containing 1% hydrogen peroxide, and dried in an incubator at 37° C. or in a vacuum-desiccator.

The yield is 30 gm. of chemically pure, white material, representing 83.5% of the theoretically expected amount.

The structural formula of the reaction product is as follows:

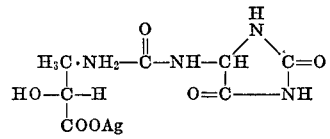

Its molecular weight is 355. Its silver content is 30.5%. Its solubility in water at 25° C. is 0.2%; this increases in the presence of products of normal microbial metabolism.

EXAMPLE NO. 2

Silver Citro Allantoinate

Method of preparation

In 1.5 liter of hot distilled water (75° C.) is dissolved a mixture of 75 gms. of sodium citrate, dihydrate which equals 65.5 gm. anhydrous sodium citrate and 25 gms. of allantoin. The solution is filtered.

200 ml. of silver nitrate (50% solution is distilled water) is added. The 200 ml. of 50% silver nitrate equals 63.5 gm. Ag$^+$.

The reaction product is cooled at room temperature, and then further cooled and stored for one hour at 4° C. The resulting precipitate is filtered off, washed with cold water containing 1% hydrogen peroxide, and dried in an incubator at 37° C. or in a vacuum desiccator.

The precipitate recovered is 120 gms. of crystalline, white material which represents a yield of 96% of the theoretical yield. It contains 51% silver, 19% allantoin and 30% citrate by weight.

The reaction mechanism is as follows:

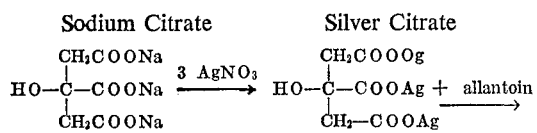

Silver citro allantoinate has the following structural formula:

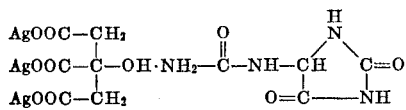

Its molecular weight is 654. Its solubility in water at 25° C. is 0.075%; this increases in the presence of normal microbial metabolism.

In formulating the silver organic acid allantoinates into medicinal products, carriers are used. These can be cream or gel bases, powder bases or an allantoin diluent and carrier as set out in the application entitled "Anti-Microbial Composition Utilizing Allantoin Carrier," above referred to.

I claim:
1. A physiologically compatible organic acid silver salt allantoin complex.
2. A silver salt allantoin complex as defined in Claim 1, specifically silver citro allantoinate.
3. A silver salt allantoin complex as defined in Claim 1, specifically silver lacto allantoinate.

References Cited
UNITED STATES PATENTS

| | | | |
|---|---|---|---|
| 2,336,131 | 12/1943 | Schaffer | 260—299 |
| 2,689,809 | 9/1954 | Fessler | 424—28 X |
| 2,985,541 | 5/1961 | Gagliardi et al. | 260—299 |
| 3,632,596 | 1/1972 | Mecca | 260—299 |

OTHER REFERENCES

Sagarin, *Cosmetics, Science, and Technology*, Interscience, 1957, pp. 161–2 and 848.

R. J. GALLAGHER, Primary Examiner

U.S. Cl. X.R.

424—245